(12) United States Patent
Klug

(10) Patent No.: US 7,108,917 B2
(45) Date of Patent: Sep. 19, 2006

(54) VARIABLY IMPREGNATED FLEXIBLE GRAPHITE MATERIAL AND METHOD

(75) Inventor: Jeremy Klug, Brunswick, OH (US)

(73) Assignee: Advanced Energy Technology Inc., Wilmington, DE (US)

( * ) Notice: Subject to any disclaimer, the term of this patent is extended or adjusted under 35 U.S.C. 154(b) by 150 days.

(21) Appl. No.: 10/766,420

(22) Filed: Jan. 28, 2004

(65) Prior Publication Data

US 2005/0164004 A1 Jul. 28, 2005

(51) Int. Cl.
*B32B 9/00* (2006.01)

(52) U.S. Cl. .................................................... 428/408

(58) Field of Classification Search ................ 428/408, 428/38, 39, 40; 264/51, 293
See application file for complete search history.

(56) References Cited

U.S. PATENT DOCUMENTS

| 1,137,373 | A | * | 4/1915 | Alysworth | ................. | 252/511 |
|---|---|---|---|---|---|---|
| 3,404,061 | A | | 10/1968 | Shane | ........................ | 161/125 |
| 4,895,713 | A | | 1/1990 | Greinke | ...................... | 423/448 |
| 4,946,892 | A | * | 8/1990 | Chung | ......................... | 524/847 |
| 5,017,209 | A | * | 5/1991 | Yoshimura | .................... | 65/499 |
| 5,192,605 | A | * | 3/1993 | Mercuri et al. | ............. | 442/417 |
| 5,902,762 | A | | 5/1999 | Mercuri | ....................... | 501/99 |
| 6,410,128 | B1 | | 6/2002 | Calarco | .................. | 428/313.9 |
| 6,432,336 | B1 | * | 8/2002 | Mercuri et al. | ............... | 264/51 |
| 6,605,379 | B1 | * | 8/2003 | Mercuri et al. | ............... | 429/38 |
| 6,663,807 | B1 | * | 12/2003 | Klug | .......................... | 264/105 |
| 6,777,086 | B1 | * | 8/2004 | Norley et al. | ............... | 428/408 |

\* cited by examiner

*Primary Examiner*—Jennifer C. McNeil
*Assistant Examiner*—Daniel Miller
(74) *Attorney, Agent, or Firm*—Waddey & Patterson; James R. Cartiglia

(57) ABSTRACT

A flexible graphite sheet material having improved molding characteristics is provided by effecting resin impregnation such that the resin profile across one of the dimensions of the sheet is non-uniform.

10 Claims, 1 Drawing Sheet

VARIABLY IMPREGNATED FLEXIBLE GRAPHITE MATERIAL AND METHOD

TECHNICAL FIELD

A flexible graphite sheet material having variable resin impregnation through its thickness is provided, along with methods for producing the inventive sheet material. The inventive materials are particularly useful for the formation of components for fuel cells, such as flow field plates, gas diffusion layers, and/or electrodes and such.

BACKGROUND OF THE ART

An ion exchange membrane fuel cell, more specifically a proton exchange membrane (PEM) fuel cell, produces electricity through the chemical reaction of hydrogen and oxygen in the air. Within the fuel cell, electrodes, denoted as anode and cathode, surround a polymer electrolyte to form what is generally referred to as a membrane electrode assembly, or MEA. Oftentimes, the electrodes also function as the gas diffusion layer (or GDL) of the fuel cell. A catalyst material stimulates hydrogen molecules to split into hydrogen atoms and then, at the membrane, the atoms each split into a proton and an electron. The electrons are utilized as electrical energy. The protons migrate through the electrolyte and combine with oxygen and electrons to form water.

A PEM fuel cell includes a membrane electrode assembly sandwiched between two flow field plates. Conventionally, the membrane electrode assembly consists of random-oriented carbon fiber paper electrodes (anode and cathode) with a thin layer of a catalyst material, particularly platinum or a platinum group metal coated on isotropic carbon particles, such as lamp black, bonded to either side of a proton exchange membrane disposed between the electrodes. In operation, hydrogen flows through channels in one of the flow field plates to the anode, where the catalyst promotes its separation into hydrogen atoms and thereafter into protons that pass through the membrane and electrons that flow through an external load. Air flows through the channels in the other flow field plate to the cathode, where the oxygen in the air is separated into oxygen atoms, which join with the protons through the proton exchange membrane and the electrons through the circuit, and combine to form water. Since the membrane is an insulator, the electrons travel through an external circuit in which the electricity is utilized, and join with protons at the cathode. An air stream on the cathode side is one mechanism by which the water formed by combination of the hydrogen and oxygen is removed. Combinations of such fuel cells are used in a fuel cell stack to provide the desired voltage.

It has been disclosed that a graphite sheet that has been provided with through-channels, which are preferably smooth-sided, and which pass between the parallel, opposed surfaces of the flexible graphite sheet and are separated by walls of compressed expandable graphite, can be used to form gas diffusion layers for PEM fuel cells. As taught by Mercuri, Weber and Warddrip in U.S. Pat. No. 6,413,671, the disclosure of which is incorporated herein by reference, the through-channels can be formed in the flexible graphite sheet at a plurality of locations by a compressive mechanical impact, such as by use of rollers having truncated protrusions extending therefrom. The through-channel pattern can be devised in order to control, optimize or maximize fluid flow through the through-channels, as desired. For instance, the pattern formed in the flexible graphite sheet can comprise selective placement of the through-channels, or it can comprise variations in through-channel density or shape in order to, for instance, reduce or minimize flooding, control gas flow, restrict water flow, equalize fluid pressure along the surface of the electrode when in use, or for other purposes. See, for instance, Mercuri and Krassowski in International Publication No. WO 02/41421 A1.

Compressive force may also be used to form the continuous reactant flow channel in the material used to form a flow field plate (hereinafter "FFP"). Typically an embossing tool is used to compress the graphite sheet and emboss the channels along the surface of the sheet. Unlike, the GDL, the channel(s) in the FFP do not extend through the FFP from one opposed surface to a second surface. Typically, the channel(s) is on one surface of the FFP, although a cooling channel can be formed on the other surface, for the flow of a cooling fluid therealong.

In addition, and as taught by Mercuri et al. in U.S. Pat. No. 6,528,199, the disclosure of which is incorporated herein by reference, a combination GDL/FFP can be provided, wherein a reactant flow channel is formed in a graphite sheet that has been provided with channels. Therefore, both the fluid flow function of an FFP and the fluid diffusion function of a GDL can be combined in a single component.

Depending on the desired end use of the flexible graphite sheet, whether it be flow field plate, gas diffusion layer, catalyst support, or a non-fuel cell application such as heat sinks, heat spreaders or thermal interfaces for electronic thermal management applications, it may be necessary to emboss features on one or more surfaces of the sheet, such as flow field channels. Different methods have been proposed for providing embossed features with improved feature definition (see, for instance, U.S. Pat. Nos. 6,604,457 and 6,663,807, both to Klug; and International Publication No. WO 02/084760 A2, also to Klug). However, further optimization of the flexible graphite sheet material itself is still believed within reach.

What is desired, therefore, is a flexible graphite sheet material (and method for producing the material) formed so as to further facilitate the formation of embossed features on one or both surfaces thereof. The desired material should have characteristics which permit the embossing of features thereon while reducing the values of the process parameters of the embossing process. The desired material should also facilitate the functioning of the sheet material in its end-use application, such as a fuel cell component.

Graphites are made up of layered planes of hexagonal arrays or networks of carbon atoms. These layered planes of hexagonally arranged carbon atoms are substantially flat and are oriented or ordered so as to be substantially parallel and equidistant to one another. The substantially flat, parallel equidistant sheets or layers of carbon atoms, usually referred to as graphene layers or basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphites possess anisotropic structures and thus exhibit or possess many properties that are highly directional, e.g., thermal and electrical conductivity and fluid diffusion.

Graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite sheets possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction, and thus form an expanded or intumesced graphite structure in which the laminar character of the carbon layers is substantially retained.

Graphite flake which has been greatly expanded and more particularly expanded so as to have a final thickness or "c" direction dimension which is as much as about 80 or more times the original "c" direction dimension can be formed without the use of a binder into cohesive or integrated sheets of expanded graphite, e.g. webs, papers, strips, tapes, foils, mats or the like (typically referred to as "flexible graphite"). The formation of graphite particles which have been expanded to have a final thickness or "c" dimension which is as much as about 80 times or more the original "c" direction dimension into integrated flexible sheets by compression, without the use of any binding material, is believed to be possible due to the mechanical interlocking, or cohesion, which is achieved between the voluminously expanded graphite particles. These flexible graphite sheets can be described as sheets of compressed particles of exfoliated graphite.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles and graphite layers substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which is as much as about 80 or more times that of the original particles so as to form a substantially flat, flexible, integrated graphite sheet. The expanded graphite particles that generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 0.04 g/cc to about 2.0 g/cc. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal and electrical properties of the sheet are very different, by orders of magnitude, for the "c" and "a" directions.

SUMMARY OF THE INVENTION

One aspect of the invention is a flexible graphite sheet material having a variable resin concentration, particularly through the thickness of the sheet material. More specifically, the flexible graphite sheet material is formed such that the resin concentration assumes a profile which varies through the thickness of the sheet in order to provide different sheet characteristics, such as to facilitate the formation of structures or complex shapes in the material, to manipulate the release characteristics of the sheet, etc. In the preferred embodiment, the resin concentration through the thickness of the sheet material is greatest at or near one of the surfaces of the sheet.

Another embodiment of the invention is to form a laminate of a plurality of flexible graphite sheets, at least two of the sheets forming the laminate having a resin profile through the thickness of the sheet. In this way, the sheets forming the outer surfaces of the laminate can be arrayed such that the regions of greatest resin concentration can be at or near those surfaces forming the surfaces of the laminate. This would facilitate the formation of structures or shapes at both surfaces. For instance, a laminate of two flexible graphite sheets can be formed, each of the sheets having a resin concentration through the thickness of the sheet material greatest at or near one of the surfaces of the sheet. If the laminate is formed such that those greatest resin concentration surfaces are the external surfaces of the laminate, the formation of embossments on the two major surfaces of the laminate is thus facilitated.

A further aspect of the invention involves a method for impregnating a resin into a flexible graphite sheet so as to assume a resin profile through the thickness of the sheet. The development of specific resin profiles, which can range from a linear function from the surface where impregnation is effected through to the surface not subject to impregnation to a sharp transition at one level through the thickness of the sheet, can be controlled through resin concentration, sheet density, travel speed of the flexible graphite sheet during impregnation and impregnation vacuum level. In addition, the impregnation can be controlled so as to ensure that at least some of the resin bleeds completely through the sheet to the other surface, to create a stronger bond between two adjoining sheets in a laminate.

In yet another aspect of the invention, the coated sheets can be employed in the formation of components for a PEM fuel cell, including a gas diffusion layer and/or a flow field plate, and in the formation of electronic thermal management components, such as a heat sink, a heat spreader and/or a thermal interface. In addition, the embossed sheets can also be used to form components for a flow-through capacitor, as described by Calarco et al. in U.S. Pat. No. 6,410,128.

Thus, it is an object of the present invention to provide a resin-impregnated flexible graphite sheet having a non-uniform resin concentration through the thickness of the sheet.

It is another object of the present invention to provide a resin-impregnated flexible graphite sheet where the resin concentration through the thickness of the sheet is selected to control sheet properties across the thickness of the sheet.

It is yet another object of the present invention to provide a resin-impregnated flexible graphite sheet where the resin concentration through the thickness of the sheet is controlled to facilitate the formation of structures on one of the surfaces of the sheet.

It is still another object of the present invention to provide a resin-impregnated flexible graphite sheet having surface characteristics manipulated so as to facilitate the formation of structures on the surface.

It is another object of the present invention to provide a method for production of a resin-impregnated flexible graphite sheet having a non-uniform resin concentration through the thickness of the sheet.

These objects and others which will be apparent to the skilled artisan can be accomplished by providing a flexible graphite sheet having two major surfaces and having improved molding characteristics at one of its major surfaces, the sheet formed of a sheet of compressed particles of resin-impregnated exfoliated graphite having a non-uniform resin concentration across one of the dimensions of the sheet. In the preferred embodiment of the invention, the resin concentration through the thickness of the sheet is non-uniform, varying either in a linear fashion or in a non-linear fashion.

A laminate having two major surfaces can be formed from at least one flexible graphite sheet as described above, where the surface having improved molding characteristics is oriented so as to form one of the external surfaces of the laminate. Preferably, the laminate is formed from a plurality of such flexible graphite sheets, wherein the laminate is formed such that the external major surfaces of the laminate comprise flexible graphite sheet surfaces having improved molding characteristics.

A process for producing the inventive flexible graphite sheet is also presented, the process including compressing particles of exfoliated graphite to form a sheet of a first density; impregnating a resin composition into the sheet so as to provide a non-uniform resin concentration across one of the dimensions of the sheet to form a resin-impregnated sheet; and compressing the resin-impregnated sheet to a second density. Resin impregnation in accordance with the process can be effected by passing the sheet through a resin-impregnation zone at a certain speed; and/or applying the resin to one of the major surfaces of the sheet and drawing a vacuum from the other major surface of the sheet to draw resin into the sheet. Providing a non-uniform resin concentration across one of the dimensions of the sheet in accordance with the inventive method can be achieved by varying a resin-impregnation variable selected from the group consisting of resin concentration, first density, speed at which the sheet passes through the resin-impregnation zone, impregnation vacuum level, and combinations thereof. The inventive laminate can be formed by forming a laminate comprising at least one flexible graphite sheet produced as described above.

It is to be understood that both the foregoing general description and the following detailed description provide embodiments of the invention and are intended to provide an overview or framework of understanding and nature and character of the invention as it is claimed. The accompanying drawing is included to provide a further understanding of the invention and are incorporated in and constitute a part of the specification. The drawings illustrate various embodiments of the invention and together with the description serve to describe the principles and operations of the invention.

BRIEF DESCRIPTION OF THE DRAWING

The FIGURE shows a system for the continuous production of resin-impregnated flexible graphite sheets.

DETAILED DESCRIPTION OF THE INVENTION

Figure 1:
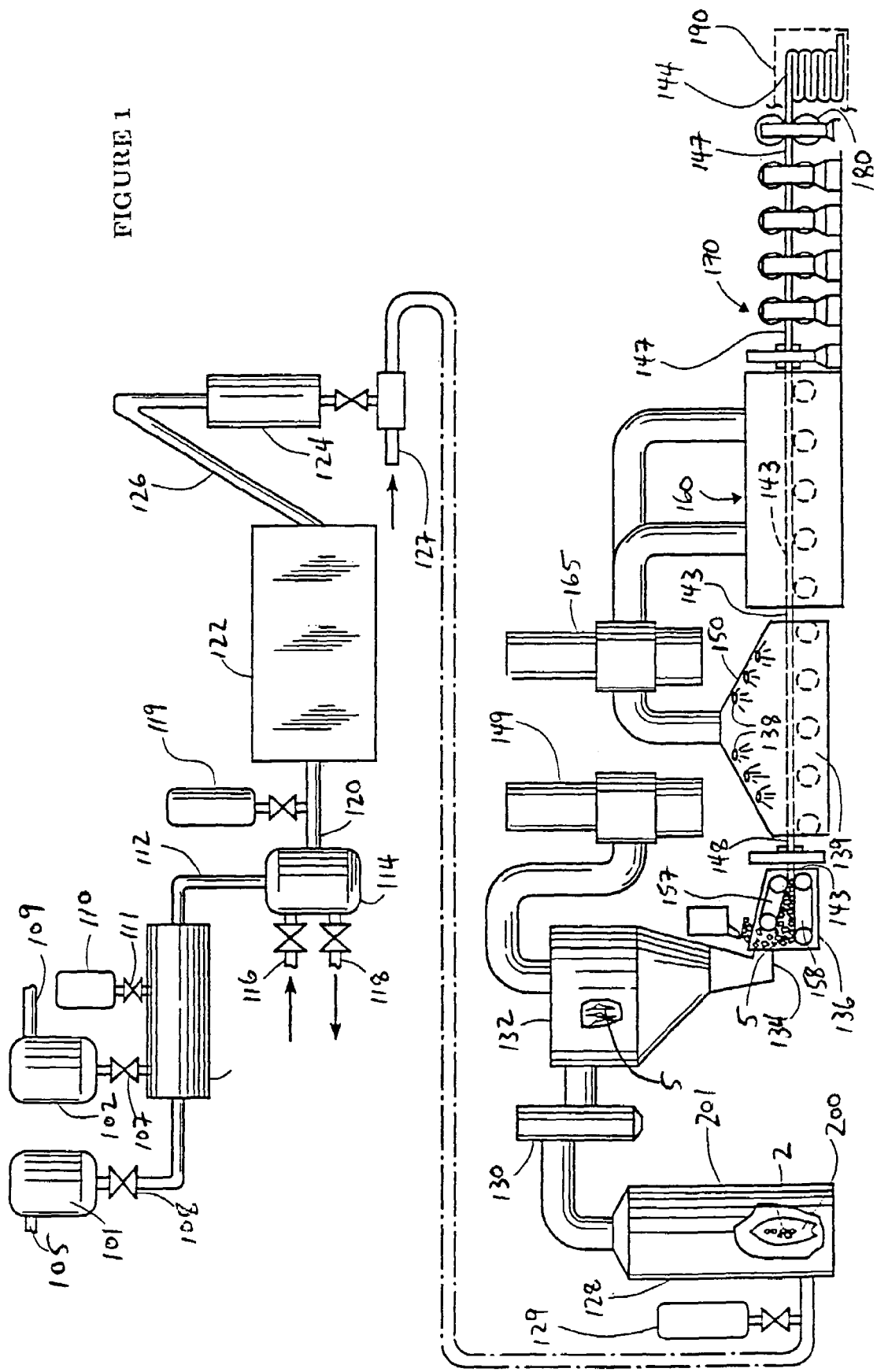

The present invention relates to flexible graphite sheet material exhibiting improved characteristics due to a variable resin profile, especially through the thickness of the sheet. Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite." Upon exposure to high temperature, the intercalant within the graphite volatilizes, causing the particles of intercalated graphite to expand in dimension as much as about 80 or more times its original volume in an accordion-like fashion in the "c" direction, i.e. in the direction perpendicular to the crystalline planes of the graphite. The exfoliated graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact.

Graphite starting materials for the flexible sheets suitable for use in the present invention include highly graphitic carbonaceous materials capable of intercalating organic and inorganic acids as well as halogens and then expanding when exposed to heat. These highly graphitic carbonaceous materials most preferably have a degree of graphitization of about 1.0. As used in this disclosure, the term "degree of graphitization" refers to the value g according to the formula:

$$g = \frac{3.45 - d(002)}{0.095}$$

where d(002) is the spacing between the graphitic layers of the carbons in the crystal structure measured in Angstrom units. The spacing d between graphite layers is measured by standard X-ray diffraction techniques. The positions of diffraction peaks corresponding to the (002), (004) and (006) Miller Indices are measured, and standard least-squares techniques are employed to derive spacing which minimizes the total error for all of these peaks. Examples of highly graphitic carbonaceous materials include natural graphites from various sources, as well as other carbonaceous materials such as carbons prepared by chemical vapor deposition and the like. Natural graphite is most preferred.

The graphite starting materials for the flexible sheets used in the present invention may contain non-carbon components so long as the crystal structure of the starting materials maintains the required degree of graphitization and they are capable of exfoliation. Generally, any carbon-containing material, the crystal structure of which possesses the required degree of graphitization and which can be exfoliated, is suitable for use with the present invention. Such graphite preferably has an ash content of less than twenty weight percent. More preferably, the graphite employed for the present invention will have a purity of at least about 94%. In the most preferred embodiment, such as for fuel cell applications, the graphite employed will have a purity of at least about 99%.

A common method for manufacturing graphite sheet is described by Shane et al. in U.S. Pat. No. 3,404,061, the disclosure of which is incorporated herein by reference. In the typical practice of the Shane et al. method, natural graphite flakes are intercalated by dispersing the flakes in a solution containing e.g., a mixture of nitric and sulfuric acid, advantageously at a level of about 20 to about 300 parts by weight of intercalant solution per 100 parts by weight of graphite flakes (pph). The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solution may contain metal halides such as ferric chloride, and ferric chloride mixed with sulfuric acid, or a halide, such as bromine as a solution of bromine and sulfuric acid or bromine in an organic solvent.

The quantity of intercalation solution may range from about 20 to about 150 pph and more typically about 50 to about 120 pph. After the flakes are intercalated, any excess solution is drained from the flakes and the flakes are water-washed. Alternatively, the quantity of the intercalation solution may be limited to between about 10 and about 50 pph, which permits the washing step to be eliminated as taught and described in U.S. Pat. No. 4,895,713, the disclosure of which is also herein incorporated by reference.

The particles of graphite flake treated with intercalation solution can optionally be contacted, e.g. by blending, with a reducing organic agent selected from alcohols, sugars, aldehydes and esters which are reactive with the surface film of oxidizing intercalating solution at temperatures in the range of 25° C. and 125° C. Suitable specific organic agents include hexadecanol, octadecanol, 1-octanol, 2-octanol, decylalcohol, 1, 10 decanediol, decylaldehyde, 1-propanol, 1,3 propanediol, ethyleneglycol, polypropylene glycol, dextrose, fructose, lactose, sucrose, potato starch, ethylene glycol monostearate, diethylene glycol dibenzoate, propylene glycol monostearate, glycerol monostearate, dimethyl oxylate, diethyl oxylate, methyl formate, ethyl formate, ascorbic acid and lignin-derived compounds, such as sodium lignosulfate. The amount of organic reducing agent is suitably from about 0.5 to 4% by weight of the particles of graphite flake.

The use of an expansion aid applied prior to, during or immediately after intercalation can also provide improvements. Among these improvements can be reduced exfoliation temperature and increased expanded volume (also referred to as "worm volume"). An expansion aid in this context will advantageously be an organic material sufficiently soluble in the intercalation solution to achieve an improvement in expansion. More narrowly, organic materials of this type that contain carbon, hydrogen and oxygen, preferably exclusively, may be employed. Carboxylic acids have been found especially effective. A suitable carboxylic acid useful as the expansion aid can be selected from aromatic, aliphatic or cycloaliphatic, straight chain or branched chain, saturated and unsaturated monocarboxylic acids, dicarboxylic acids and polycarboxylic acids which have at least 1 carbon atom, and preferably up to about 15 carbon atoms, which is soluble in the intercalation solution in amounts effective to provide a measurable improvement of one or more aspects of exfoliation. Suitable organic solvents can be employed to improve solubility of an organic expansion aid in the intercalation solution.

Representative examples of saturated aliphatic carboxylic acids are acids such as those of the formula $H(CH_2)_n COOH$ wherein n is a number of from 0 to about 5, including formic, acetic, propionic, butyric, pentanoic, hexanoic, and the like. In place of the carboxylic acids, the anhydrides or reactive carboxylic acid derivatives such as alkyl esters can also be employed. Representative of alkyl esters are methyl formate and ethyl formate. Sulfuric acid, nitric acid and other known aqueous intercalants have the ability to decompose formic acid, ultimately to water and carbon dioxide. Because of this, formic acid and other sensitive expansion aids are advantageously contacted with the graphite flake prior to immersion of the flake in aqueous intercalant. Representative of dicarboxylic acids are aliphatic dicarboxylic acids having 2–12 carbon atoms, in particular oxalic acid, fumaric acid, malonic acid, maleic acid, succinic acid, glutaric acid, adipic acid, 1,5-pentanedicarboxylic acid, 1,6-hexanedicarboxylic acid, 1,10-decanedicarboxylic acid, cyclohexane-1, 4-dicarboxylic acid and aromatic dicarboxylic acids such as phthalic acid or terephthalic acid. Representative of alkyl esters are dimethyl oxylate and diethyl oxylate. Representative of cycloaliphatic acids is cyclohexane carboxylic acid and of aromatic carboxylic acids are benzoic acid, naphthoic acid, anthranilic acid, p-aminobenzoic acid, salicylic acid, o-, m- and p-tolyl acids, methoxy and ethoxybenzoic acids, acetoacetamidobenzoic acids and, acetamidobenzoic acids, phenylacetic acid and naphthoic acids. Representative of hydroxy aromatic acids are hydroxybenzoic acid, 3-hydroxy-1-naphthoic acid, 3-hydroxy-2-naphthoic acid, 4-hydroxy-2-naphthoic acid, 5-hydroxy-1-naphthoic acid, 5-hydroxy-2-naphthoic acid, 6-hydroxy-2-naphthoic acid and 7-hydroxy-2-naphthoic acid. Prominent among the polycarboxylic acids is citric acid.

The intercalation solution will be aqueous and will preferably contain an amount of expansion aid of from about 1 to 10%, the amount being effective to enhance exfoliation. In the embodiment wherein the expansion aid is contacted with the graphite flake prior to or after immersing in the aqueous intercalation solution, the expansion aid can be admixed with the graphite by suitable means, such as a V-blender, typically in an amount of from about 0.2% to about 10% by weight of the graphite flake.

After intercalating the graphite flake, and following the blending of the intercalant coated intercalated graphite flake with the organic reducing agent, the blend is exposed to temperatures in the range of 25° to 125° C. to promote reaction of the reducing agent and intercalant coating. The heating period is up to about 2 hours, with shorter heating periods, e.g., at least about 10 minutes, for higher temperatures in the above-noted range. Times of one-half hour or less, e.g., on the order of 10 to 25 minutes, can be employed at the higher temperatures.

The above described methods for intercalating and exfoliating graphite flake may beneficially be augmented by a pretreatment of the graphite flake at graphitization temperatures, i.e. temperatures in the range of about 3000° C. and above and by the inclusion in the intercalant of a lubricious additive.

The pretreatment, or annealing, of the graphite flake results in significantly increased expansion (i.e., increase in expansion volume of up to 300% or greater) when the flake is subsequently subjected to intercalation and exfoliation. Indeed, desirably, the increase in expansion is at least about 50%, as compared to similar processing without the annealing step. The temperatures employed for the annealing step should not be significantly below 3000° C., because temperatures even 100° C. lower result in substantially reduced expansion.

The annealing of the present invention is performed for a period of time sufficient to result in a flake having an enhanced degree of expansion upon intercalation and subsequent exfoliation. Typically the time required will be 1 hour or more, preferably 1 to 3 hours and will most advantageously proceed in an inert environment. For maximum beneficial results, the annealed graphite flake will also be subjected to other processes known in the art to enhance the degree expansion—namely intercalation in the presence of an organic reducing agent, an intercalation aid such as an organic acid, and a surfactant wash following intercalation. Moreover, for maximum beneficial results, the intercalation step may be repeated.

The annealing step of the instant invention may be performed in an induction furnace or other such apparatus as is known and appreciated in the art of graphitization; for the temperatures here employed, which are in the range of 3000° C., are at the high end of the range encountered in graphitization processes.

Because it has been observed that the worms produced using graphite subjected to pre-intercalation annealing can sometimes "clump" together, which can negatively impact area weight uniformity, an additive that assists in the formation of "free flowing" worms is highly desirable. The addition of a lubricious additive to the intercalation solution facilitates the more uniform distribution of the worms across the bed of a compression apparatus (such as the bed of a calender station conventionally used for compressing, or "calendering," graphite worms into flexible graphite sheet). The resulting sheet therefore has higher area weight uniformity and greater tensile strength. The lubricious additive is preferably a long chain hydrocarbon, more preferably a hydrocarbon having at least about 10 carbons. Other organic compounds having long chain hydrocarbon groups, even if other functional groups are present, can also be employed.

More preferably, the lubricious additive is an oil, with a mineral oil being most preferred, especially considering the fact that mineral oils are less prone to rancidity and odors, which can be an important consideration for long term storage. It will be noted that certain of the expansion aids detailed above also meet the definition of a lubricious additive. When these materials are used as the expansion aid, it may not be necessary to include a separate lubricious additive in the intercalant.

The lubricious additive is present in the intercalant in an amount of at least about 1.4 pph, more preferably at least about 1.8 pph. Although the upper limit of the inclusion of lubricous additive is not as critical as the lower limit, there does not appear to be any significant additional advantage to including the lubricious additive at a level of greater than about 4 pph.

The thus treated particles of graphite are sometimes referred to as "particles of intercalated graphite." Upon exposure to high temperature, e.g. temperatures of at least about 160° C. and especially about 700° C. to 1200° C. and higher, the particles of intercalated graphite expand as much as about 80 to 1000 or more times their original volume in an accordion-like fashion in the c-direction, i.e. in the direction perpendicular to the crystalline planes of the constituent graphite particles. The expanded, i.e. exfoliated, graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.075 mm to 3.75 mm and a typical density of about 0.1 to 1.5 grams per cubic centimeter (g/cc). From about 1.5–30% by weight of ceramic additives can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 millimeters. The width of the particles is suitably from about 0.04 to 0.004 mm. The ceramic fiber particles are non-reactive and non-adhering to graphite and are stable at temperatures up to about 1100° C., preferably about 1400° C. or higher. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

As noted above, the flexible graphite sheets are also treated with resin and the absorbed resin, after curing, enhances the moisture resistance and handling strength, i.e. stiffness, of the flexible graphite sheet as well as "fixing" the morphology of the sheet. Suitable resin content is preferably at least about 5% by weight, more preferably about 10 to 35% by weight, and suitably up to about 60% by weight. Resins found especially useful in the practice of the present invention include acrylic-, epoxy- and phenolic-based resin systems, fluoro-based polymers, or mixtures thereof. Suitable epoxy resin systems include those based on diglycidyl ether of bisphenol A (DGEBA) and other multifunctional resin systems; phenolic resins that can be employed include resole and novolac phenolics. Optionally, the flexible graphite may be impregnated with fibers and/or salts in addition to the resin or in place of the resin. Additionally, reactive or non-reactive additives may be employed with the resin system to modify properties (such as tack, material flow, hydrophobicity, etc.).

Alternatively, the flexible graphite sheets of the present invention may utilize particles of reground flexible graphite sheets rather than freshly expanded worms. The sheets may be newly formed sheet material, recycled sheet material, scrap sheet material, or any other suitable source.

Also the processes of the present invention may use a blend of virgin materials and recycled materials.

The source material for recycled materials may be sheets or trimmed portions of sheets that have been compression molded as described above, or sheets that have been compressed with, for example, pre-calendering rolls, but have not yet been impregnated with resin. Furthermore, the source material may be sheets or trimmed portions of sheets that have been impregnated with resin, but not yet cured, or sheets or trimmed portions of sheets that have been impregnated with resin and cured. The source material may also be recycled flexible graphite PEM fuel cell components such as flow field plates or electrodes. Each of the various sources of graphite may be used as is or blended with natural graphite flakes.

Once the source material of flexible graphite sheets is available, it can then be comminuted by known processes or devices, such as a jet mill, air mill, blender, etc. to produce particles. Preferably, a majority of the particles have a diameter such that they will pass through 20 U.S. mesh; more preferably a major portion (greater than about 20%, most preferably greater than about 50%) will not pass through 80 U.S. mesh. Most preferably the particles have a particle size of no greater than about 20 mesh. It may be desirable to cool the flexible graphite sheet when it is resin-impregnated as it is being comminuted to avoid heat damage to the resin system during the comminution process.

The size of the comminuted particles may be chosen so as to balance machinability and formability of the graphite article with the thermal characteristics desired. Thus, smaller particles will result in a graphite article which is easier to machine and/or form, whereas larger particles will result in a graphite article having higher anisotropy, and, therefore, greater in-plane electrical and thermal conductivity.

If the source material has been resin impregnated, then preferably the resin is removed from the particles. Details of the resin removal are further described below.

Once the source material is comminuted, and any resin is removed, it is then re-expanded. The re-expansion may occur by using the intercalation and exfoliation process described above and those described in U.S. Pat. No. 3,404,061 to Shane et al. and U.S. Pat. No. 4,895,713 to Greinke et al.

Typically, after intercalation the particles are exfoliated by heating the intercalated particles in a furnace. During this exfoliation step, intercalated natural graphite flakes may be added to the recycled intercalated particles. Preferably, during the re-expansion step the particles are expanded to have a specific volume in the range of at least about 100 cc/g and up to about 350 cc/g or greater. Finally, after the re-expansion step, the re-expanded particles may be compressed into flexible sheets, as hereinafter described.

If the starting material has been impregnated with a resin, the resin should preferably be at least partially removed from the particles. This removal step should occur between the comminuting step and the re-expanding step.

In one embodiment, the removing step includes heating the resin containing regrind particles, such as over an open flame. More specifically, the impregnated resin may be heated to a temperature of at least about 250° C. to effect resin removal. During this heating step care should be taken to avoid flashing of the resin decomposition products; this can be done by careful heating in air or by heating in an inert atmosphere. Preferably, the heating should be in the range of from about 400° C. to about 800° C. for a time in the range of from at least about 10 and up to about 150 minutes or longer.

Additionally, the resin removal step may result in increased tensile strength of the resulting article produced from the molding process as compared to a similar method in which the resin is not removed. The resin removal step may also be advantageous because during the expansion step (i.e., intercalation and exfoliation), when the resin is mixed with the intercalation chemicals, it may in certain instances create toxic byproducts.

Thus, by removing the resin before the expansion step a superior product is obtained such as the increased strength characteristics discussed above. The increased strength characteristics are a result of in part because of increased expansion. With the resin present in the particles, expansion may be restricted.

In addition to strength characteristics and environmental concerns, resin may be removed prior to intercalation in view of concerns about the resin possibly creating a run away exothermic reaction with the acid.

In view of the above, preferably a majority of the resin is removed. More preferably, greater than about 75% of the resin is removed. Most preferably, greater than 99% of the resin is removed.

Once the flexible graphite sheet is comminuted, it is formed into the desired shape and then cured, in the preferred embodiment. Alternatively, the sheet can be cured prior to being comminuted, although post-comminution cure is preferred.

With reference to the FIGURE, a system is disclosed for the continuous production of resin-impregnated flexible graphite sheet, where graphite flakes and a liquid intercalating agent are charged into reactor 104. More particularly, a vessel 101 is provided for containing a liquid intercalating agent. Vessel 101, suitably made of stainless steel, can be continually replenished with liquid intercalant by way of conduit 106. Vessel 102 contains graphite flakes that, together with intercalating agents from vessel 101, are introduced into reactor 104. The respective rates of input into reactor 104 of intercalating agent and graphite flake are controlled, such as by valves 108, 107. Graphite flake in vessel 102 can be continually replenished by way of conduit 109. Additives, such as intercalation enhancers, e.g., trace acids, and organic chemicals may be added by way of dispenser 110 that is metered at its output by valve 111.

The resulting intercalated graphite particles are soggy and acid coated and are conducted (such as via conduit 112) to a wash tank 114 where the particles are washed, advantageously with water which enters and exits wash tank 114 at 116, 118. The washed intercalated graphite flakes are then passed to drying chamber 122 such as through conduit 120. Additives such as buffers, antioxidants, pollution reducing chemicals can be added from vessel 119 to the flow of intercalated graphite flake for the purpose of modifying the surface chemistry of the exfoliate during expansion and use and modifying the gaseous emissions which cause the expansion.

The intercalated graphite flake is dried in dryer 122, preferably at temperatures of about 75° C. to about 150° C., generally avoiding any intumescence or expansion of the intercalated graphite flakes. After drying, the intercalated graphite flakes are fed as a stream into flame 200, by, for instance, being continually fed to collecting vessel 124 by way of conduit 126 and then fed as a stream into flame 200 in expansion vessel 128 as indicated at 2. Additives such as ceramic fiber particles formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like can be added from vessel 129 to the stream of intercalated graphite particles propelled by entrainment in a non-reactive gas introduced at 127.

The intercalated graphite particles 2, upon passage through flame 200 in expansion chamber 201, expand more than 80 times in the "c" direction and assume a "worm-like" expanded form 5; the additives introduced from 129 and blended with the stream of intercalated graphite particles are essentially unaffected by passage through the flame 200. The expanded graphite particles 5 may pass through a gravity separator 130, in which heavy ash natural mineral particles are separated from the expanded graphite particles, and then into a wide topped hopper 132. Separator 130 can be by-passed when not needed.

The expanded, i.e., exfoliated graphite particles 5 fall freely in hopper 132 together with any additives, and are randomly dispersed and passed into compression station 136, such as through trough 134. Compression station 136 comprises opposed, converging, moving porous belts 157, 158 spaced apart to receive the exfoliated, expanded graphite particles 5. Due to the decreasing space between opposed moving belts 157, 158, the exfoliated expanded graphite particles are compressed into a mat of flexible graphite, indicated at 148 having thickness of, e.g., from about 25.4 to 0.075 mm, especially from about 25.4 to 2.5 mm, and a density of from about 0.08 to 2.0 g/cm$^3$. Gas scrubber 149 may be used to remove and clean gases emanating from the expansion chamber 201 and hopper 132.

The mat 148 is passed through vessel 150 and is impregnated with liquid resin from spray nozzles 138, the resin advantageously being "pulled through the mat" by means of vacuum chamber 139 and the resin is thereafter preferably dried in dryer 160 reducing the tack of the resin and the resin impregnated mat 143 is thereafter densified into roll pressed flexible graphite sheet 147 in calender mill 170. Gases and fumes from vessel 150 and dryer 160 are preferably collected and cleaned in scrubber 165.

As noted above, the sheet produced by the system illustrated in the FIGURE can be produced so as to have a non-uniform, or variable, resin profile through the thickness of the sheet. This can be accomplished in one of several ways, or by combinations of them. For instance, the resin concentration can be used to effect this non-uniform resin concentration. Thus, a more concentrated resin mixture can affect resin impregnation such that the resin concentration is higher in the sheet at the surface to which the resin is applied for impregnation. Similarly, the density of the sheet (or mat) to which the resin is applied can be manipulated; for example, a more dense mat will cause the resin concentration to be higher in the sheet at the surface to which the resin is applied for impregnation. Likewise, control of the speed at which the mat is moving through impregnation vessel 150 or of the vacuum level in vacuum chamber 139 can have the same effect.

By use of a non-uniform or variable resin profile in the flexible graphite sheet, especially through the thickness of the flexible graphite sheet, complex shapes or structures can be easier to form on the surface of the sheet. This is due to the fact that a higher percentage of flowable resin is near the outside molding surface of the sheet, leading to a reduced requirement for pressure and/or temperature for flow and formation during the molding process. Moreover, with a higher percentage of flowable resin near the molding surface, cracking of the molding surface can be reduced.

Advantageously, when a laminate is being formed, the resin profile through the thickness of one or more of the flexible graphite sheets from which the laminate is to be formed can be controlled such that the major surface not being used as the molding surface has a certain amount of bleed-through of the resin, to promote the inter-layer bonding of the laminate. This can also help to arrest cracks and prevent them from bridging between the outer surfaces of the laminate, reducing the fluid permeability of the laminate through crack deflection.

All cited patents and publications referred to in this application are incorporated by reference.

The invention thus being described, it will be obvious that it may be varied in many ways. Such variations are not to be regarded as a departure from the spirit and scope of the present invention and all such modifications as would be obvious to one skilled in the art are intended to be included within the scope of the following claims.

What is claimed is:

1. A flexible graphite sheet having two major surfaces and having improved molding characteristics at one of its major surfaces, comprising a sheet of compressed particles of resin-impregnated exfoliated graphite having a non-uniform resin concentration through the thickness of the sheet.

2. The sheet of claim 1 wherein the resin concentration through the thickness of the sheet varies in a linear fashion.

3. The sheet of claim 1 wherein the resin concentration through the thickness of the sheet varies in a non-linear fashion.

4. The sheet of claim 1 wherein molded structures are formed in the surface having improved molding characteristics.

5. A laminate having two major surfaces and comprising a plurality of flexible graphite sheets, the laminate having improved molding characteristics at one of its major surfaces and which comprises a sheet of compressed particles of resin-impregnated exfoliated graphite having a non-uniform resin concentration through the thickness of the sheet, wherein the surface having improved molding characteristics is oriented so as to form one of the external surfaces of the laminate.

6. The laminate of claim 5 wherein the resin concentration through the thickness of the at least one flexible graphite sheet varies in a linear fashion.

7. The laminate of claim 5 wherein the resin concentration through the thickness of the at least one flexible graphite sheet varies in a non-linear fashion.

8. The laminate of claim 5 wherein molded structures are formed in the surface having improved molding characteristics.

9. The laminate of claim 5 which comprises a plurality of flexible graphite sheets, each comprising a sheet of compressed particles of resin-impregnated exfoliated graphite having a non-uniform resin concentration across one of the dimensions of the sheet, wherein the laminate is formed such that the external major surfaces of the laminate comprise flexible graphite sheet surfaces having improved molding characteristics.

10. The laminate of claim 9 wherein molded structures are formed in each of the major surfaces of the laminate.

* * * * *